Patented Oct. 22, 1940

2,219,009

UNITED STATES PATENT OFFICE 2,219,009

TRIARYLMETHANE DYESTUFFS

Wilhelm Eckert and Karl Schilling, Frankfort-on-the-Main-Hoechst, Germany, assignors to General Aniline & Film Corporation, a corporation of Delaware No Drawing. Application June 22, 1939, Serial No. 280,584. In Germany July 6, 1938

5 Claims. (Cl. 260—335)

The present invention relates to triarylmethane dyestuffs.

We have found that very clear and fast dyestuffs, capable of being chromed, of the triarylmethane series are obtainable by condensing an N-acyl derivative of an amino-trimellitic acid or an anhydride or an anhydro-compound thereof with an aromatic hydroxyl compound containing a reactive nuclear hydrogen atom and in meta-position to the hydroxyl group a substituted amino-group or a second hydroxyl group. This is surprising since the free amino-trimellitic acids and the anhydrides thereof do not show this reaction even in the presence of condensing agents.

The acyl derivatives of amino-trimellitic acids used as parent materials which have, for instance, the following formulae

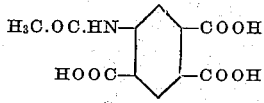

and

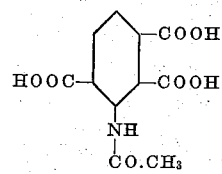

and the anhydrides or anhydro-compounds thereof, for instance of the following formula:

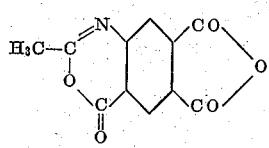

may be prepared by reaction of the corresponding halogen trimellitic acids with ammonia, para-toluene sulfamide or a similar compound and subsequent reaction of the products obtained with acid chlorides or anhydrides.

Aromatic hydroxyl compounds containing a reactive nuclear hydrogen atom and, in meta-position to the hydroxyl group, a substituted amino-group or a hydroxyl-group, are, for instance, the following: meta-dimethyl-aminophenol, meta-dimethylamino-para-cresol and the corresponding diethyl-, dipropyl-, dibutyl-, diisobutyl-derivatives; furthermore, the hydroxyl compounds of the above type containing different substituents at the nitrogen, such as meta-methyl-ethyl-aminophenol, meta-methylethylamino-para-cresol or the like; further, meta-mono-methylaminophenol and meta-monomethylamino-para-cresol and the corresponding compounds containing alkyls of higher molecular weight; further 3-hydroxy-diphenylamine and its derivatives; m-piperidylphenol (obtainable from resorcinol and piperidine at about 150° C. (cf. U. S. Patent No. 2,153,059, Example 10)), N-(3-hydroxyphenyl)-morpholine (obtainable from resorcinol and morpholine (cf. U. S. Patent No. 2,153,059,)); further, meta-disulfethyl-aminophenol, 3-ethylsulfethylamino-4-methylphenol, meta-methyl-sulfethylaminophenol; meta-dihydroxyethylaminophenol; further, resorcinol, halogen-resorcinol, nitroresorcinol, resorcylic acid and the like; pyrogallol, 1.3-dihydroxy-naphthalene and the like.

For condensing acylated amino-trimellitic acids or the anhydrides thereof there may also be used condensing agents such as zinc chloride and the like.

The dyestuffs thus obtained dye animal fiber, in an acid bath, very clear orange, yellow to bluish-red tints of good properties of fastness. The dyestuffs are also suitable for chrome-printing cotton, artificial silk and the like and may be chromed in substance, the corresponding chromium complex salts being then formed. These salts dye the fiber in an acid bath very clear tints which, without after-chroming, have very good properties of fastness.

The following examples serve to illustrate the invention, but they are not intended to limit it thereto; the parts are by weight:

(1) 33 parts of diethylamino-meta-phenol and 25 parts of anhydro-5-acetylaminotrimellitic anhydride are melted together for 4 hours at 180° C. The melt soon assumes a deep red colouration and acetic acid escapes. The cooled and solidified melt is pulverized, dissolved in 440 parts of sodium carbonate solution of 10 per cent. strength, filtered, if necessary, from any unchanged diethylamino-meta-phenol and the filtrate is boiled for ½ hour. By acidifying the red solution at about 50° C. with a dilute mineral acid until acid to delta-paper a dyestuff of the following probable constitution is obtained

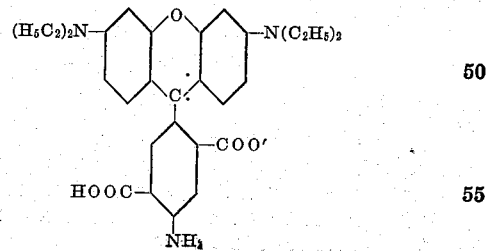

which may perhaps also possess the isomeric constitution

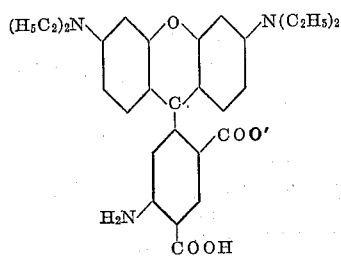

or is a mixture of the isomerides. The dyestuff is a bluish red powder which dissolves in alkalies to a red solution and dyes wool from an acid bath bluish red tints of remarkable fastness properties.

(2) 11.3 parts of 5-aminotrimellitic acid and 50 parts of acetic anhydride are boiled together until dissolution occurs. 16.5 parts of diethylamino-meta-phenol are then added and the whole is boiled for several hours in a reflux apparatus, while stirring. After cooling, the acetic anhydride is cautiously decomposed with 500 parts of water, the red precipitate formed is filtered with suction and dissolved in dilute caustic soda solution. After boiling the alkaline dyestuff solution for ½ hour, the dyestuff is precipitated by rendering the solution acid to delta-paper by means of dilute mineral acid. The product obtained is identical with the dyestuff of Example 1.

(3) 137 parts of ethylamino-meta-phenol and 115 parts of anhydro-5-acetylaminotrimellitic anhydride are melted together for 3 to 4 hours at 170° C. to 190° C. The melt becomes intensely red with evolution of acetic acid. The melt is pulverized, dissolved in 2000 parts of sodium carbonate solution of 10 per cent. strength, filtered, if necessary, and after boiling the dyestuff solution for 10 minutes at about 50° C., a dilute mineral acid is added until delta-paper assumes a yellow coloration. The precipitated dyestuff has the following probable formula

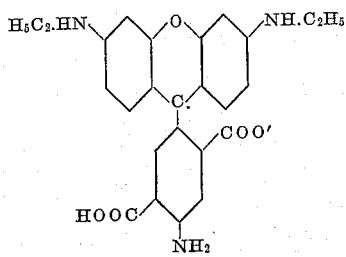

or it may perhaps also possess the isomeric constitution

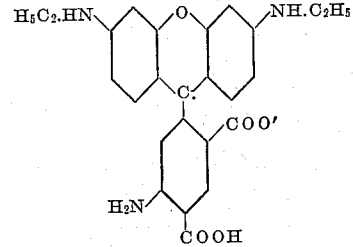

or it may be a mixture of these isomerides. The dyestuff is a brown-yellow powder which dissolves in alkalies to an orange-yellow solution and dyes wool from an acid bath the same tints of good properties of fastness.

(4) 151 parts of ethylamino-para-cresol and 115 parts of anhydro-5-acetylamino-trimellitic anhydride are together melted for 4 hours at 160° C. to 200° C., while stirring. The red dyestuff-melt is pulverized, dissolved in 2000 parts of sodium carbonate solution of 10 per cent. strength, the solution is filtered and the filtrate is boiled for a short time. By rendering the solution acid to delta-paper by means of dilute mineral acid a dyestuff is precipitated which has the probable constitution:

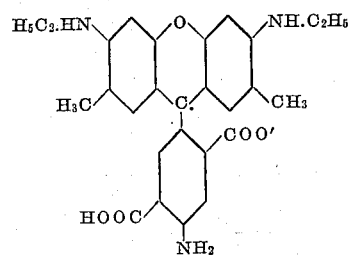

or may also possess the isomeric constitution:

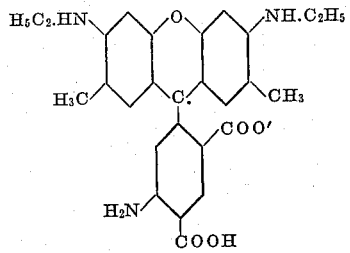

or it may be a mixture of the isomerides. The dyestuff is a red powder which dissolves in alkalies to a red solution and dyes wool from an acid bath clear red tints.

(5) 23 parts of acylated 5-amino-trimellitic acid, 22 parts of resorcinol and 13 parts of anhydrous zinc chloride are melted together for 5 hours at 180° C. to 200° C. while stirring. Acetic acid is evolved and an orange-yellow dyestuff is formed which is isolated by extracting the pulverized melt with 200 parts of boiling hydrochloric acid of 10 per cent. strength, dissolving the residue in 200 parts of caustic soda solution of 10 per cent. strength, boiling this solution for 1 hour and acidifying it until the solution spreads on filter-paper without coloring it or until delta-paper is colored a yellow shade. The dyestuff has the following probable constitution:

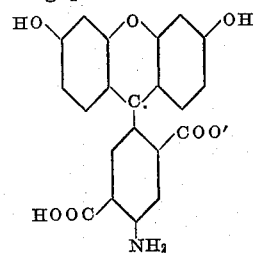

or may also possess the isomeric constitution:

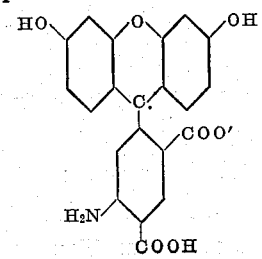

or it may be a mixture of the isomerides. The dyestuff is a yellow powder which dissolves in alkalies to a yellow-red solution and dyes wool from an acid bath purely yellow tints.

We claim:
1. The compounds of the general formula

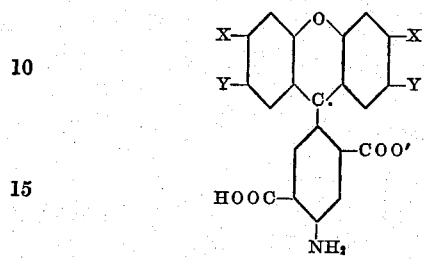

wherein both X's represent identical radicals of the group consisting of

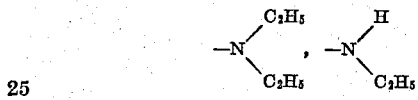

and OH, and both Y's represent identical members of the group consisting of hydrogen and methyl.

2. The compounds of the general formula

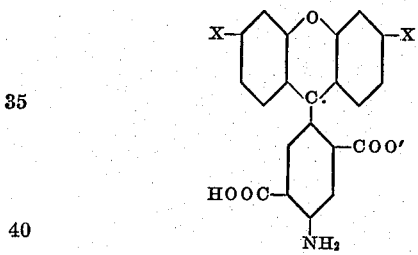

wherein both X's represent identical radicals of the group consisting of

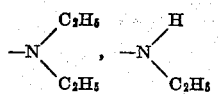

and OH.

3. The compound of the formula

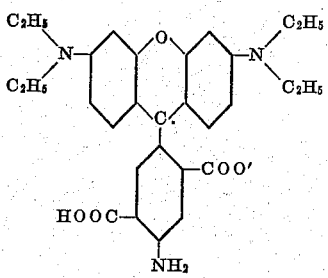

being a bluish red powder which dissolves in alkalies to a red solution and dyes wool from an acid bath bluish-red tints of remarkable fastness properties.

4. The compound of the formula

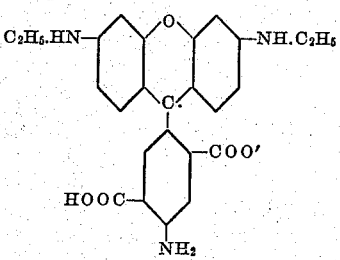

being a brown-yellow powder which dissolves in alkalies to an orange-yellow solution and dyes wool from an acid bath the same tints of good fastness properties.

5. The compound of the formula

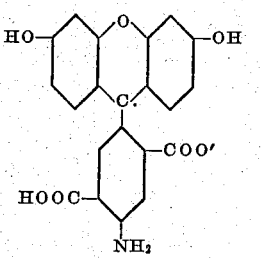

being a yellow powder which dissolves in alkalies to a yellow-red solution and dyes wool from an acid bath purely yellow tints.

WILHELM ECKERT.
KARL SCHILLING.